United States Patent
Frattarola et al.

(10) Patent No.: US 9,633,459 B2
(45) Date of Patent: Apr. 25, 2017

(54) METHODS AND SYSTEMS FOR CREATING A HULL THAT MAY HAVE CONCAVITIES

(71) Applicant: Disney Enterprises, Inc., Burbank, CA (US)

(72) Inventors: Gary Frattarola, San Diego, CA (US); Andi T. Smithers, San Diego, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 820 days.

(21) Appl. No.: 13/975,001

(22) Filed: Aug. 23, 2013

(65) Prior Publication Data

US 2015/0054832 A1   Feb. 26, 2015

(51) Int. Cl.
  *G06T 11/40*   (2006.01)

(52) U.S. Cl.
  CPC .......... *G06T 11/40* (2013.01); *G06T 2210/12* (2013.01)

(58) Field of Classification Search
  CPC .............. G06T 2207/20141; G06T 9/40; G06T 11/203; G06T 17/20; G06T 7/0081; G06T 9/20; G06T 11/40; G06T 15/04; G06T 2200/12; G06T 11/001; G06T 15/30; G06T 2210/12; G06T 11/60; G06T 15/205; G06T 11/00; G06T 13/80; H04N 5/23229
  See application file for complete search history.

(56) References Cited

U.S. PATENT DOCUMENTS

| 5,295,235 | A | | 3/1994 | Newman | |
|---|---|---|---|---|---|
| 5,319,744 | A | * | 6/1994 | Kelly | G06T 3/00 345/427 |
| 5,335,290 | A | * | 8/1994 | Cullen | G06T 9/005 358/1.9 |
| 6,047,088 | A | * | 4/2000 | van Beek | G06T 9/001 375/E7.083 |
| 6,529,628 | B1 | * | 3/2003 | Baccar | G06K 9/4638 382/149 |
| 6,587,104 | B1 | * | 7/2003 | Hoppe | G06T 17/20 345/423 |
| 7,324,706 | B2 | * | 1/2008 | Bassi | G06T 3/0006 345/643 |
| 8,243,070 | B1 | | 8/2012 | Brown | |
| 2002/0130867 | A1 | | 9/2002 | Yang et al. | |
| 2004/0227750 | A1 | * | 11/2004 | Su | G06T 11/203 345/419 |
| 2006/0127880 | A1 | * | 6/2006 | Harris | G06K 9/00127 435/4 |
| 2006/0256125 | A1 | | 11/2006 | Neal et al. | |

(Continued)

OTHER PUBLICATIONS

U.S. Appl. No. 13/974,882, filed Aug. 23, 2013, Frattarola et al.

(Continued)

*Primary Examiner* — Haixia Du
(74) *Attorney, Agent, or Firm* — Dorsey & Whitney LLP

(57) ABSTRACT

Methods and systems are disclosed for generating a hull that may have concavities. One example of such a method includes creating a collection of columns representing a first hull, growing the first hull by increasing a height of one or more columns, creating a collection of rows representing a second hull, growing the second hull by increasing a width of one or more rows, and creating a third hull by combing the first and second hulls.

19 Claims, 14 Drawing Sheets

(56) References Cited

U.S. PATENT DOCUMENTS

| | | |
|---|---|---|
| 2007/0165948 A1* | 7/2007 | Laffargue .............. G06T 17/205 |
| | | 382/173 |
| 2008/0118148 A1* | 5/2008 | Jiao ........................ G06T 15/30 |
| | | 382/173 |
| 2009/0115718 A1 | 5/2009 | Qiao et al. |
| 2010/0214294 A1* | 8/2010 | Li .......................... G06T 17/20 |
| | | 345/423 |
| 2011/0002394 A1 | 1/2011 | Gandolph et al. |
| 2011/0229033 A1 | 9/2011 | Muquit |
| 2013/0293544 A1* | 11/2013 | Schreyer ............... G06T 15/005 |
| | | 345/426 |
| 2015/0149875 A1 | 5/2015 | Masuko |

OTHER PUBLICATIONS

Imagination Technologies Ltd., "Power VR—A Master Class in Graphics Technology and Optimization", Imagination Technologies Ltd. presentation slides for Master Class in Graphics Technology and Optimization, Jan. 14, 2012, 50 pages, reference can be found at: http://www.imgtec.com/powervr/insider/powervr_presentations/GDC%20HardwareAndOptimisation.pdf.

* cited by examiner

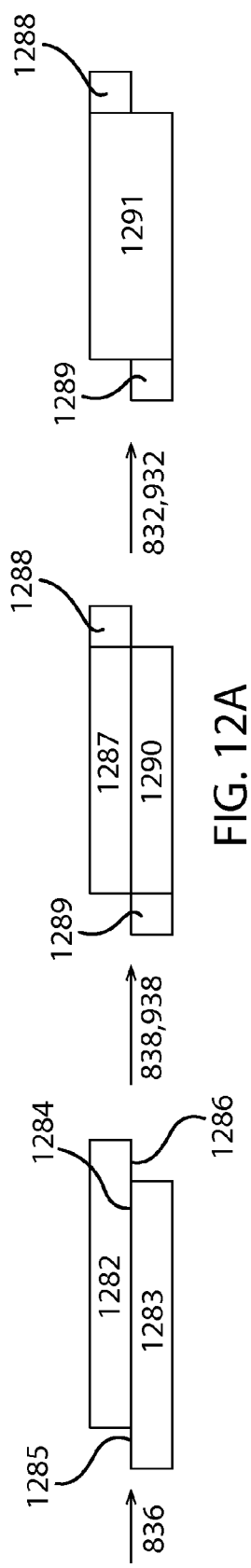
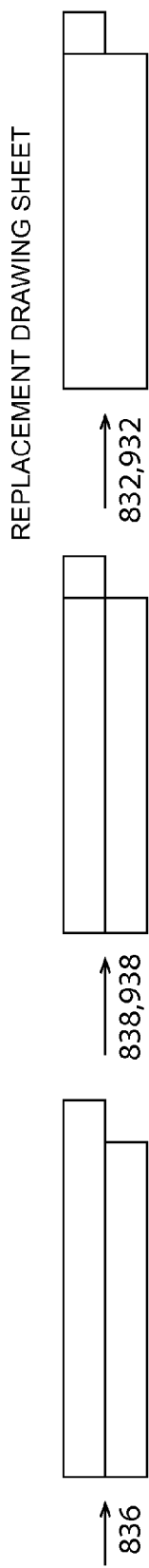
FIG. 12A
FIG. 12B
FIG. 12C

1

METHODS AND SYSTEMS FOR CREATING A HULL THAT MAY HAVE CONCAVITIES

BACKGROUND OF THE INVENTION

In computer graphics, a quad may be used to render a two dimensional sprite onto a background. The quad is typically defined such that it includes all of the pixels of the sprite. Such quads, however, can include a large number of pixels that do not add anything to the sprite—e.g., that are rendered transparently onto the background. Even though rendering these pixels does not change the background displayed on the screen because they are transparent, the rendering hardware still processes them, and consumes resources that could otherwise be available for rendering other pixels. For example, unnecessarily rendering pixels may waste a portion of the finite fill rate typically available in rendering hardware. This waste of resources is even greater when the image has an alpha channel, because read-modify-write logic may be required for every pixel within the quad.

In order to reduce the number of pixels that are unnecessarily rendered, and to thereby free up a portion of the finite fill rate, a convex hull may be created that convexly encapsulates the pixels of the sprite. The contours of the convex hull define the boundaries of pixels that will be rendered, which may encompass fewer transparent pixels than a simple quad. Even a convex hull, however, may include many transparent pixels.

BRIEF DESCRIPTION OF THE DRAWINGS

FIGS. 12A through 12C illustrate rectangles that may be divided and combined during the process of generating a polygon mesh.

DETAILED DESCRIPTION

Figure 1:
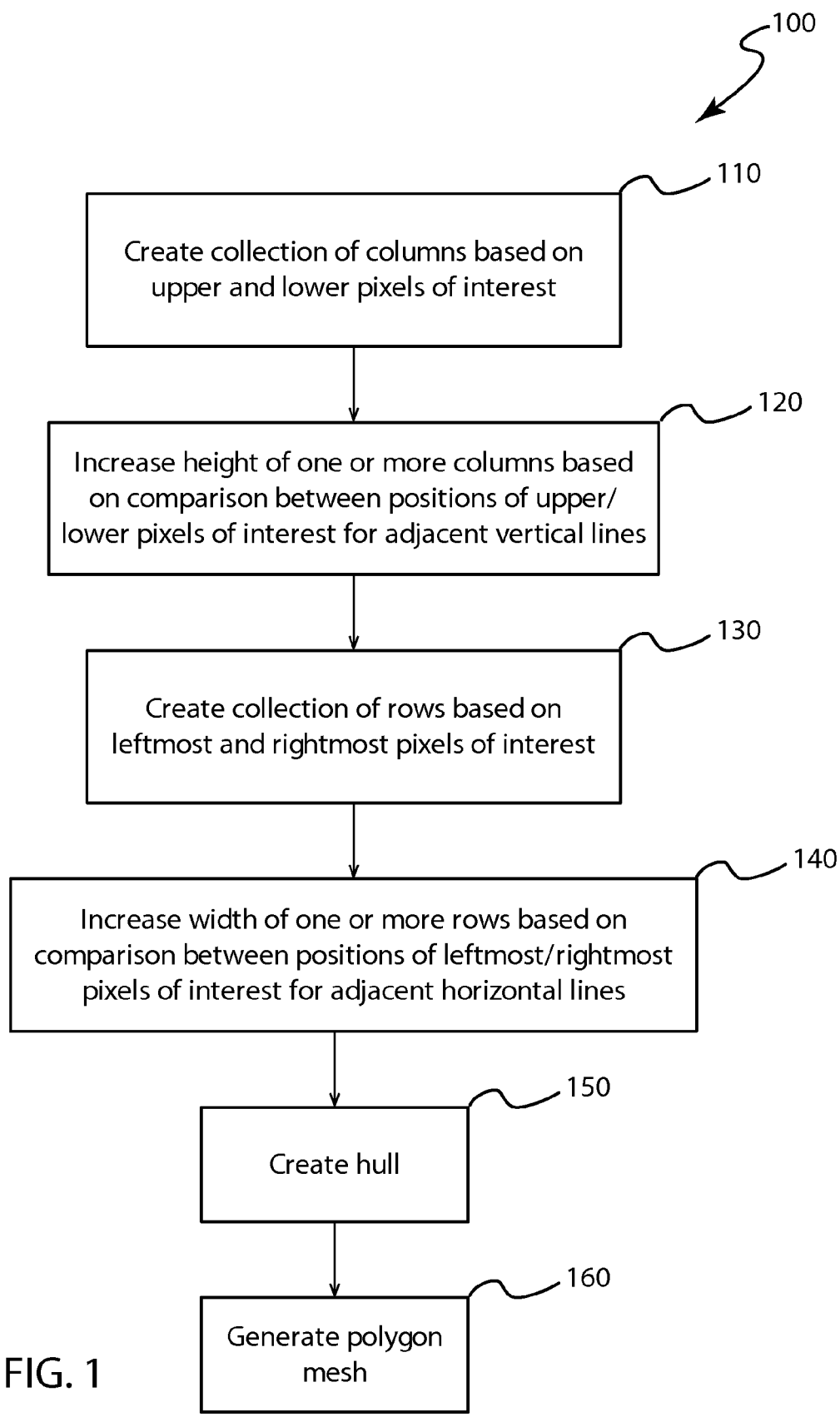
FIG. 1 is a flowchart for one embodiment of a method for creating a hull that may have concavities.
Figure 7:
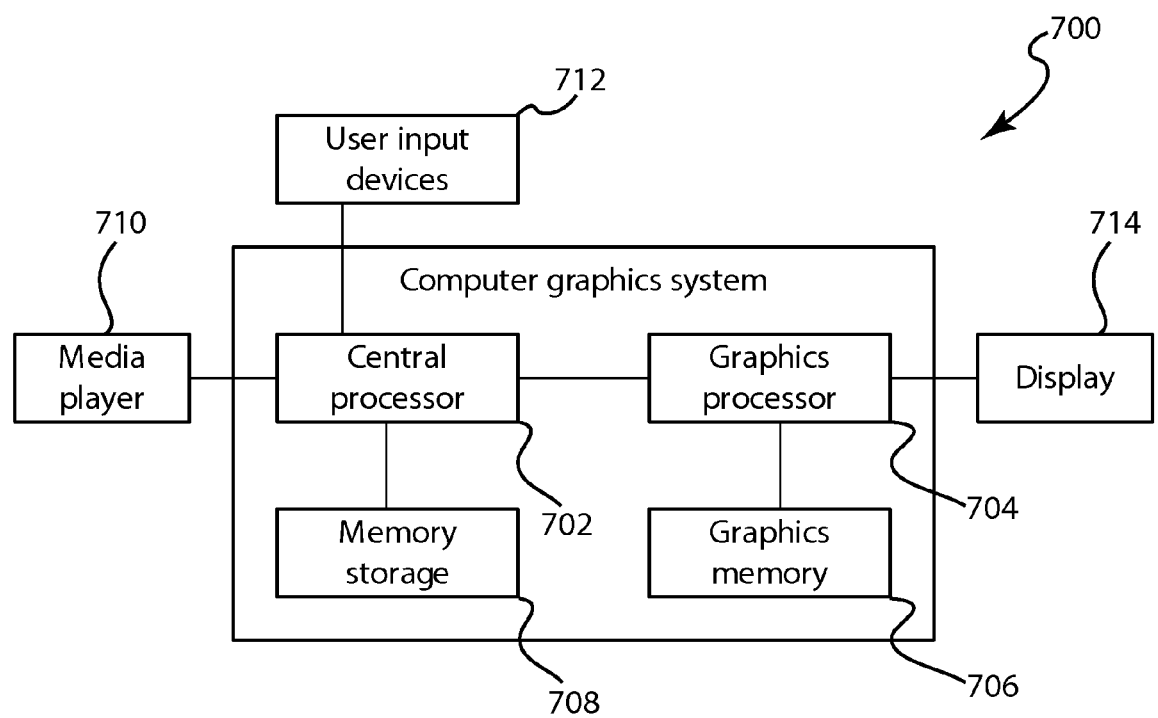
FIG. 7 is a block diagram of a computer graphics system for creating a hull that may have concavities.

FIG. 1 illustrates a method 100 that may be used to create a hull that may have concavities and also to generate a polygon mesh corresponding to the hull for use in rendering an image on a display. The method 100 may be performed by a computer graphics system, such as that shown in FIG. 7 and described below.

Method 100 may begin with operation 110, in which a collection of columns is created based on an upper pixel of interest and a lower pixel of interest for each of a plurality of vertical lines of an image. The image may be a raster image, a texture map, or generally any type of image. The collection of columns may represent a first hull, which may be convex on the left and right sides, and may be concave on the top and/or bottom sides—depending on the image from which it is derived. The pixels of interest may be visible (e.g., translucent or opaque) pixels in some embodiments. In other embodiments, the pixels of interest may be determined using chroma keying—for example, a specific color or range of colors may be designated as not being of interest in order to isolate a portion of an image from a background corresponding to the designated color or color range. In some embodiments, the upper and lower pixels of interest may be the uppermost and lowermost pixels of interest for the entire image (e.g., global upper and lower pixels of interest). In other embodiments, however, the upper and lower pixels of interest may be localized. If the upper and lower pixels of interest are localized, a plurality of collections of columns may be obtained (each collection of columns representing a separate hull) and/or one or more of the columns may include a plurality of run lengths.

Figure 3B:
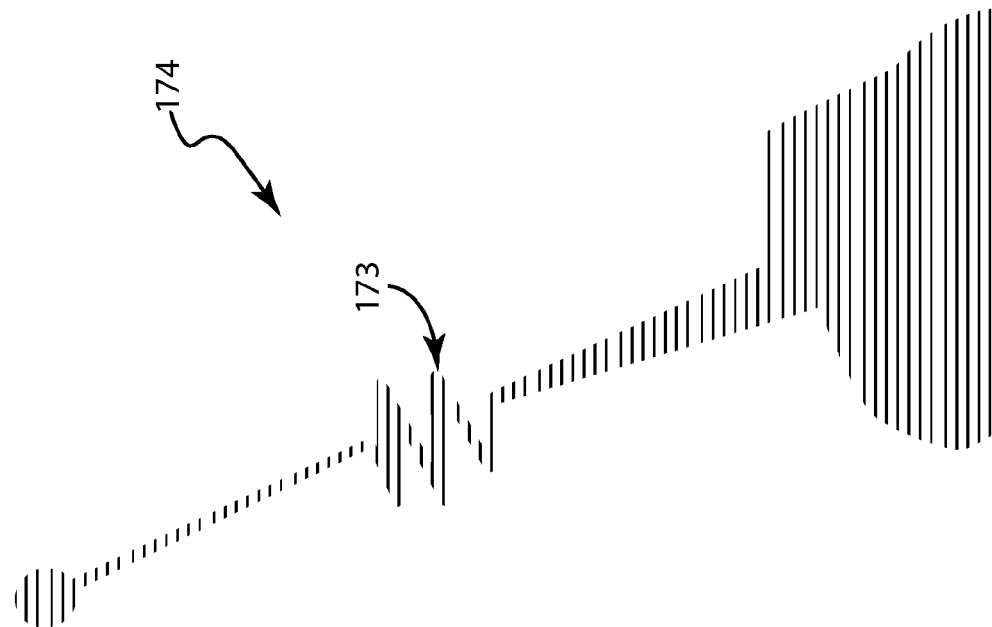
FIG. 3B illustrates a collection of rows derived from an image and that form a second hull.
Figure 3A:
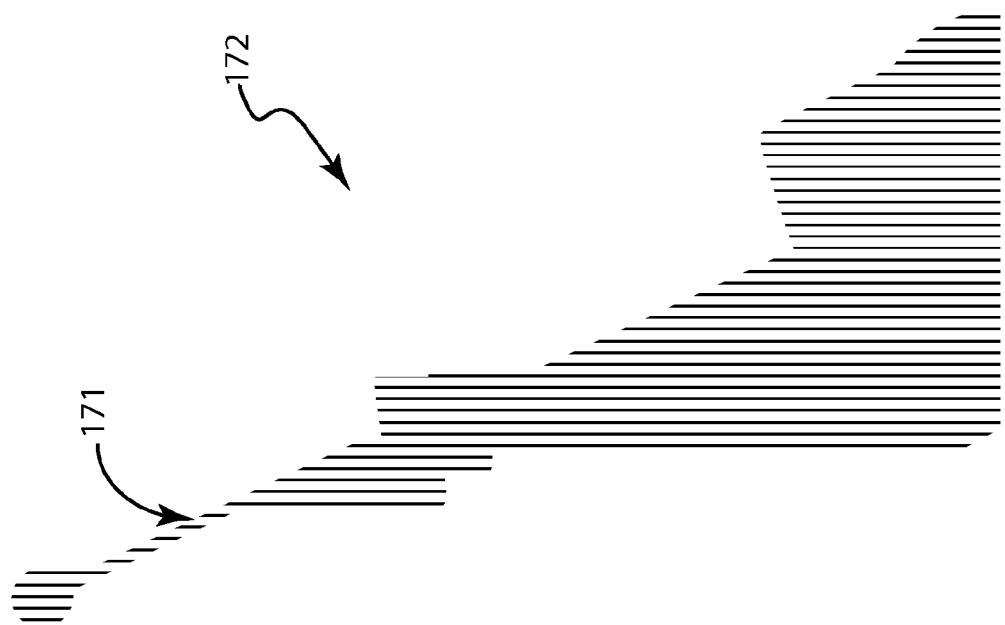
FIG. 3A illustrates a collection of columns derived from an image and that form a first hull.

To illustrate operation 110, FIG. 3A shows a plurality of columns 171 that have been created by scanning through the columns of an image from left to right, identifying the uppermost pixel of interest and lowermost pixel of interest in each column. The plurality of columns 171 define the first hull 172, which includes concavities on both its top and bottom sides.

In operation 120, the first hull may be grown by increasing a height of one or more columns in the collection of columns based on a comparison between positions of the upper and/or lower pixels of interest for two or more adjacent vertical lines of the image. Many such comparisons may be done—moving from left to right, and/or from right to left—until the entire image has been scanned. In other embodiments, however, only local areas of an image may be scanned.

Figure 4A:
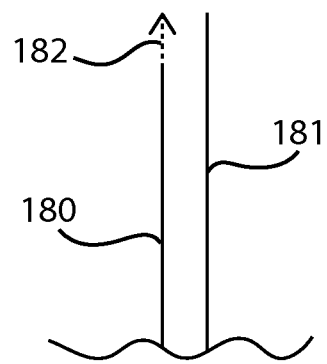
FIGS. 4A through 4D illustrate methods to grow columns and rows in a hull.
Figure 4B:
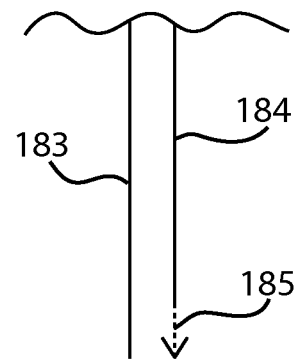

In some embodiments of operation 120, the height of the one or more columns in the collection of columns may be increased based on the positions of the upper and/or lower pixels of interest for two or more adjacent vertical lines of the image being within an error tolerance of each other. Specifically, with reference to columns 180 and 181 illustrated in FIG. 4A, the height of column 180 may be increased upward (as indicated by dotted arrow 182) so that it its top extends to and terminates at the same position as the top of the adjacent column 181. Similarly, with reference to columns 183 and 184 illustrated in FIG. 4B, the height of column 184 may be increased downward (as indicated by dotted arrow 185) so that its bottom extends to and terminates at the same position as the bottom of the adjacent column 183.

The error tolerance used in increasing the height of the columns in operation 120 (and also for increasing the width of the rows in operation 140, as described below) may be determined based on a target number of polygons to be included in a polygon mesh corresponding to the third hull created in operation 150 in some embodiments. In some cases, hardware characteristics of a target device may be known—for example, investigation of a particular electronic device may lead to the conclusion that rendering a certain number of polygons is best for the performance of that device. Furthermore, the error tolerance and/or the target number of polygons may be determined by analyzing the time and performance needed to render additional pixels versus the time and performance needed to render additional polygons. In other words, while generally it is better to render fewer pixels, if doing so requires a large number of polygons, then any performance gained by not rendering some pixels may be lost by the need to render the additional polygons. Similarly, while it is generally better to render fewer polygons, if doing so requires a large number of pixels to be unnecessarily rendered, then any performance gained by rendering fewer polygons may be lost by the need to render additional pixels. Also, in hardware that implements tile based deferred rendering, or another tiled rendering scheme, the performance cost of clipping against each tile may need to be taken into account when deciding an ideal number of polygons to be rendered.

In operation 130, a collection of rows is created based on a leftmost pixel of interest and a rightmost pixel of interest for each of a plurality of horizontal lines of the image. The collection of rows may represent a second hull, which may be convex on the top and bottom sides, and may be concave on the left and/or right sides—again depending on the image from which it is derived. In some embodiments, the leftmost and rightmost pixels of interest may be the leftmost and rightmost pixels of interest for the entire image (e.g., global leftmost and rightmost pixels of interest). In other embodiments, however, the leftmost and rightmost pixels of interest may be localized. If the leftmost and rightmost pixels of interest are localized, a plurality of collections of rows may be obtained (each collection of rows representing a separate hull) and/or one or more of the rows may include a plurality of run lengths.

To illustrate operation 130, FIG. 3B shows a plurality of rows 173 that have been created by scanning through the rows of an image from top to bottom, identifying the leftmost pixel of interest and rightmost pixel of interest in each row. The plurality of rows 173 define the second hull 174, which includes concavities on both its left and right sides.

In operation 140, the second hull may be grown by increasing the width of one or more rows in the collection of rows based on a comparison between positions of the leftmost and/or rightmost pixels of interest for two or more adjacent horizontal lines of the image. In some embodiments, the width of the one or more rows in the collection of rows may be increased based on the positions of the leftmost and/or rightmost pixels of interest for two or more adjacent horizontal lines of the image being within an error tolerance of each other—which may be determined based on known hardware characteristics, as mentioned above.

Figure 4C:
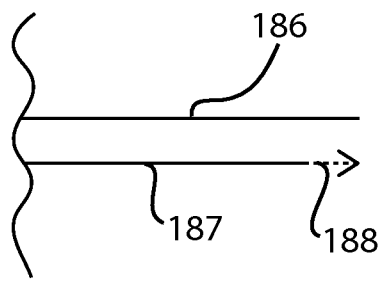
Figure 4D:
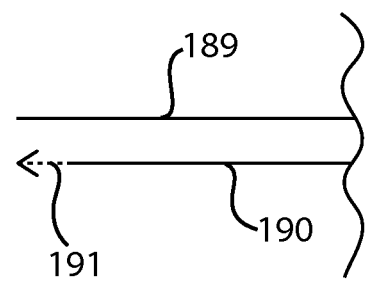

Referring to the examples illustrated in FIG. 4C, with reference to rows 186 and 187, the width of row 187 may be increased towards the right (as indicated by dotted arrow 188) so that its right end extends to and terminates at the same position as the right end of the adjacent row 186. Similarly, as illustrated in FIG. 4D, the width of row 190 may be increased towards the left (as indicated by dotted arrow 191) so that its left end extends to and terminates at the same position as the left end of the adjacent row 189.

In operation 150, a third hull may be created by combining the first and second hulls. In some embodiments, the third hull may be created by generating a collection of scan line run lengths corresponding to pixels present in both the first and second hulls—in other words, the third hull may be defined to include pixels represented in both the collection of columns from operation 110 and the collection of rows from operation 130. The third hull may be considered as the result of a logical AND of the first and second hulls.

The third hull created in operation 150 may include one or more concavities on one or more sides, depending on the image from which it is derived. In some examples, again depending on the original image, the third hull may have concavities on 1, 2, 3, or even 4 sides. In general, the third hull created in operation 150 may include concavities from both the first and second hulls created in operations 110 and 130. Because the third hull can include such concavities, rendering only the pixels within the hull may reduce the number of pixels rendered as compared to a quad-type rendering system.

Figure 5:
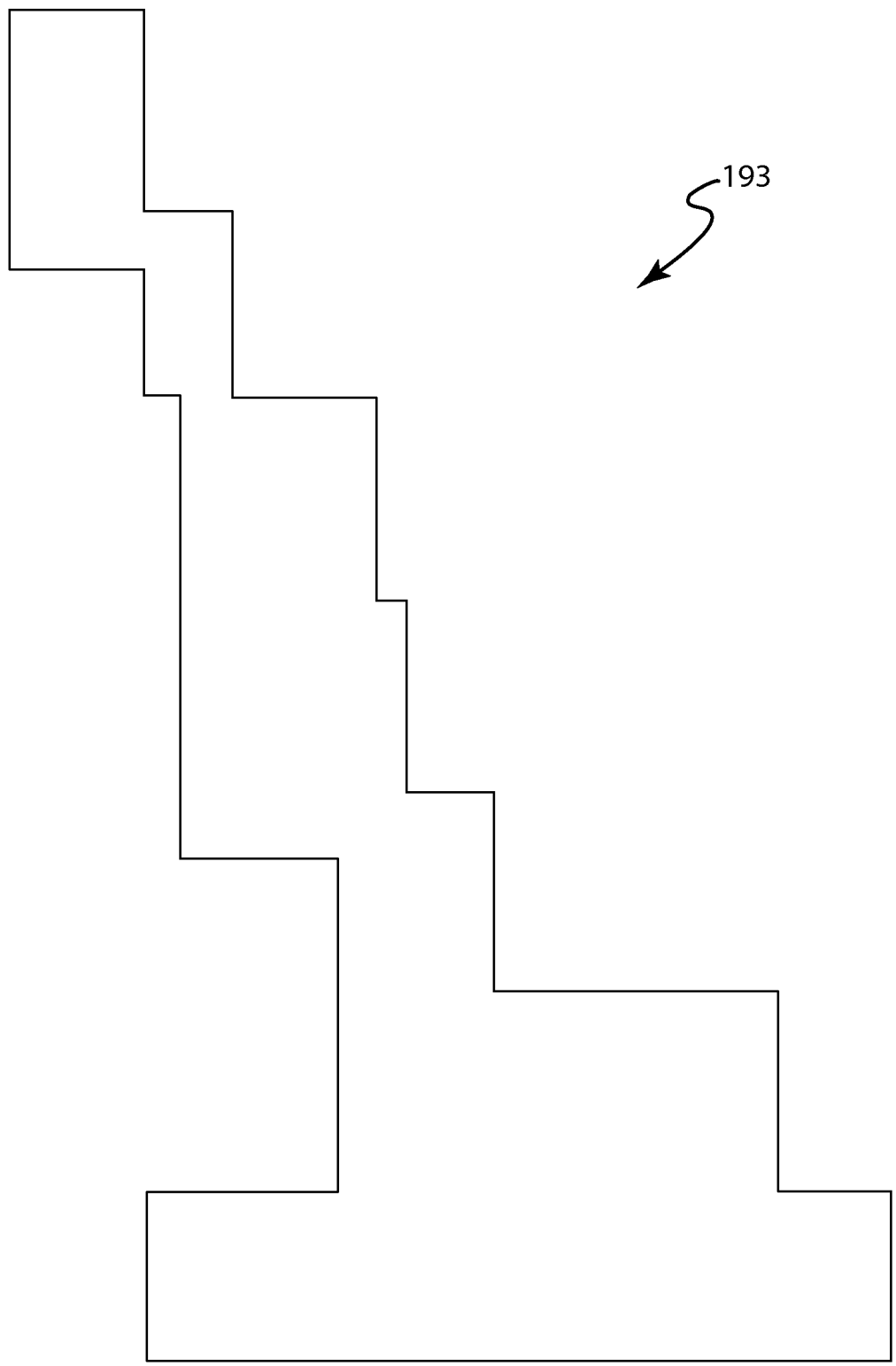
FIG. 5 illustrates a hull that may be created using one of the methods from FIGS. 1, 1A, or 2.

FIG. 5 illustrates one example of a third hull 193 that may be created in operation 150 by combining the first and second hulls from operations 110 and 130. As illustrated in FIG. 5, the third hull 193 includes many concavities, and is fairly compact around the image of interest, but not on a pixel-accurate level.

In operation 160, a polygon mesh may be generated that corresponds to the third hull. The polygon mesh may be generated in many different manners. The polygon mesh may be created, for example, by one of the methods described in U.S. patent application Ser. No. 13/974,882, entitled "Methods and Systems for Generating A Polygon Mesh," filed on Aug. 23, 2013, and with attorney docket number P239950.US.01, the entirety of which is hereby incorporated by reference for all purposes. These methods are also shown in FIGS. 8 through 13 and described below. In one example, and with reference to FIG. 9 below, a collection of scan line run lengths may be created, which may correspond to the third hull from operation 150. A collection of rectangles may be created by associating each respective scan line run length with a respective rectangle. That collection of rectangles may be modified by dividing one or more rectangles in the collection of rectangles into a plurality of rectangles, and by combining two or more adjacent rectangles in the collection of rectangles that have similar widths and/or heights. More generally, any of the methods and variations described below with reference to FIGS. 8 to 13 may be used to generate the polygon mesh in operation 160.

Figure 6:
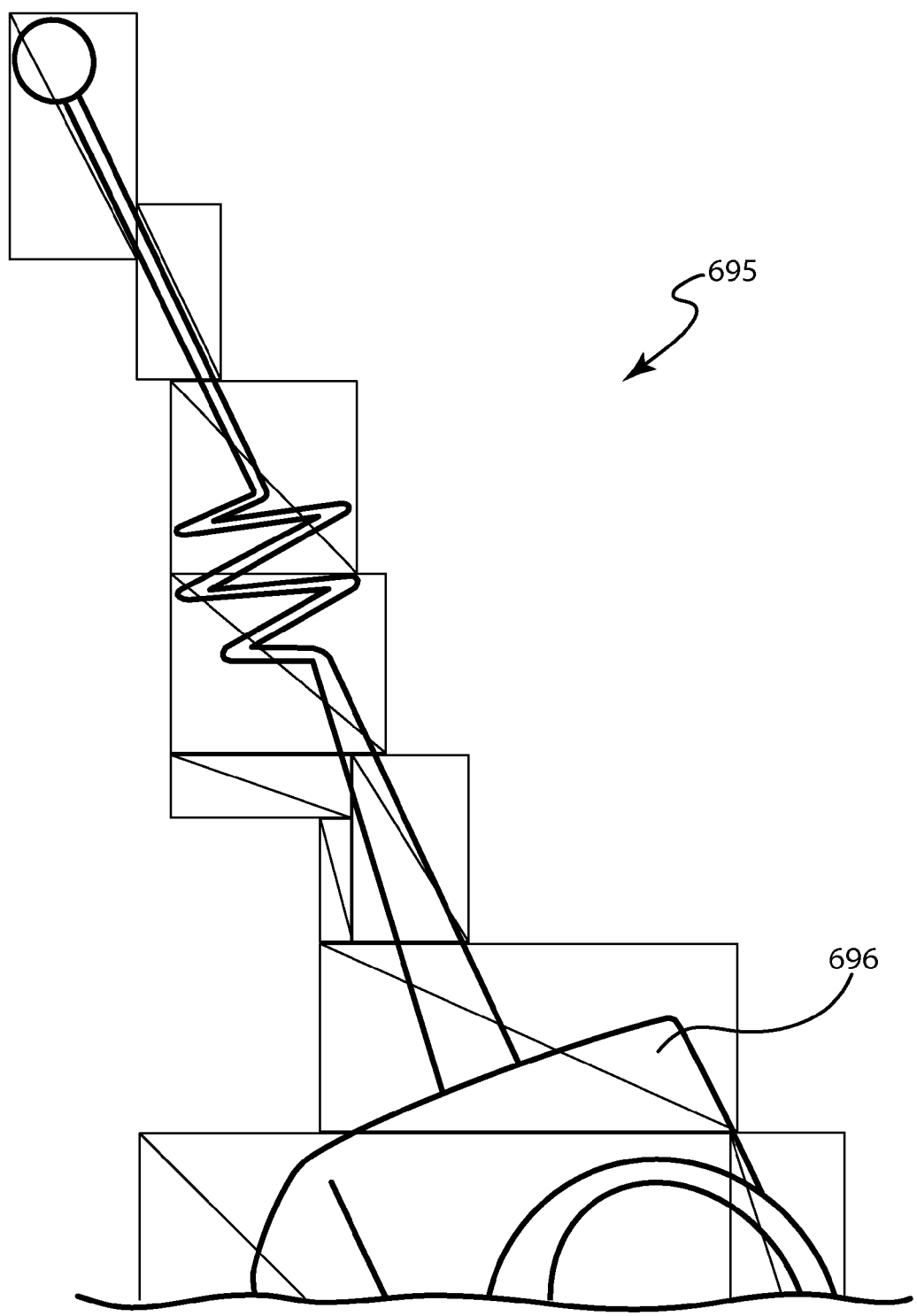
FIG. 6 illustrates one example of a polygon mesh that corresponds to the hull from FIG. 5 overlaid on an image.

FIG. 6 illustrates one example of a polygon mesh 695 (overlaid on image 696) that is generated from the hull 193 of FIG. 5. As can be seen by comparing FIG. 6 with the polygon mesh 1392 in FIG. 13, the polygon mesh 695 in FIG. 6 includes far fewer polygons, but only slightly more transparent pixels. As mentioned above, the polygon mesh 695 in FIG. 6 may represent the best trade-off for some rendering hardware between rendering unnecessary pixels and rendering too many polygons.

Figure 1A:
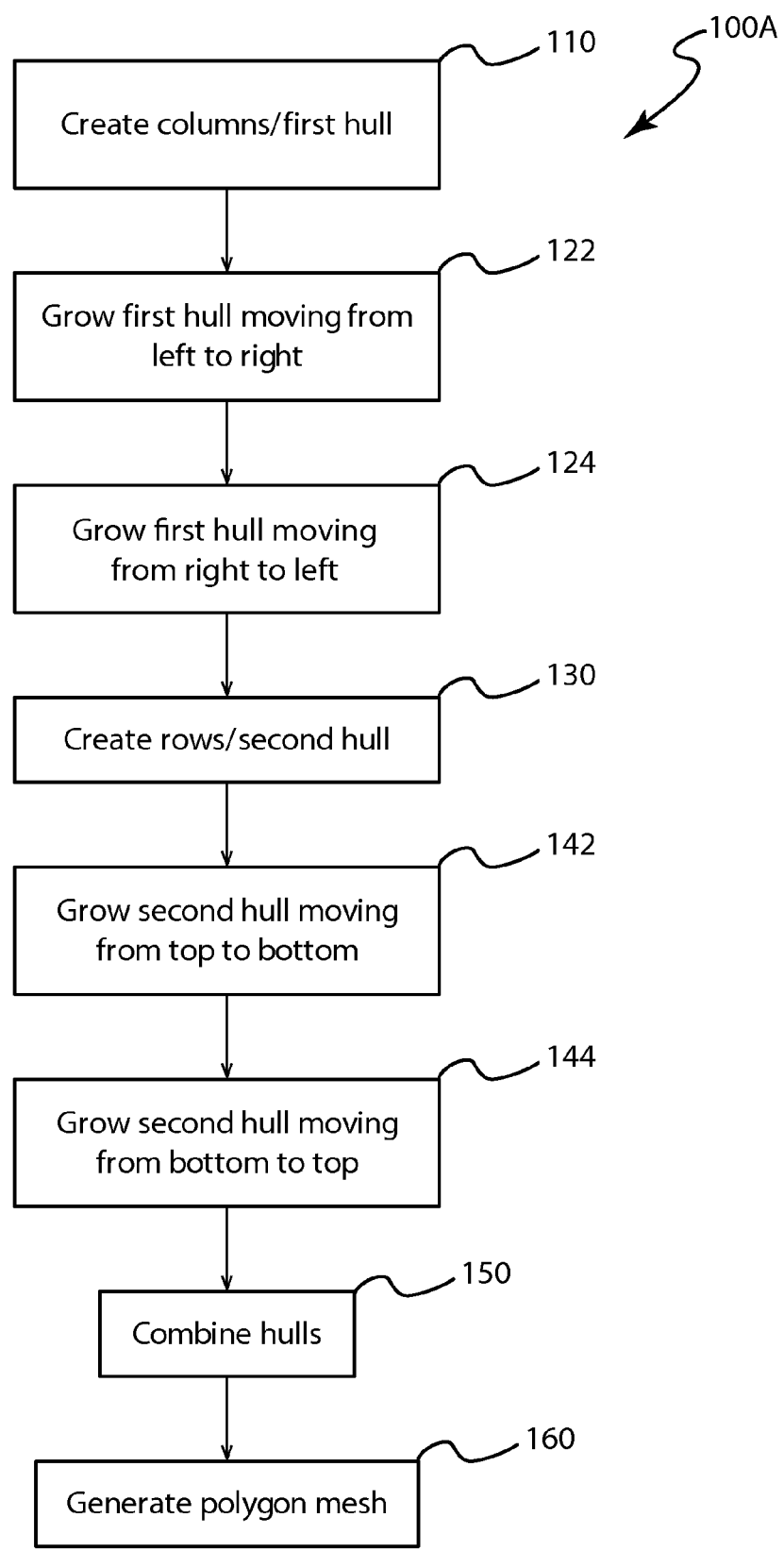
FIG. 1A is a flowchart for one embodiment of a method for creating a hull that may have concavities.

With reference now to the method 100A illustrated in FIG. 1A, which is a variation on the method 100 illustrated in FIG. 1, the method 100A may begin with operation 110, in which a collection of columns is created representing a first hull. In operation 122, the first hull is grown by increasing the height of one or more columns moving from left to right—e.g., the leftmost column is compared to its adjacent column, moving through the image all the way until the next to rightmost column is compared to the rightmost column. Similarly, in operation 124, the first hull is grown by increasing one or more columns moving from right to left. Moving through the columns of the second hull both from left to right and from right to left may cause the growing of the first hull to be more symmetrical than only moving through in a single horizontal direction.

In operation 130, a collection of rows is created representing a second hull. In operation 142, the second hull is grown by increasing the width of one or more rows moving from top to bottom—e.g., the uppermost row is compared to its adjacent row, moving through the image all the way until the next to lowermost row is compared to the lowermost row. Similarly, in operation 144, the second hull is grown by increasing one or more columns moving from bottom to top. As above, moving through the rows of the second hull both from top to bottom and from bottom to top may cause the growing of the second hull to be more symmetrical than only moving through in a single vertical direction.

In operation 150, the first and second hulls are combined, and in operation 160 a polygon mesh is generated that corresponds to the boundaries of the combined, third hull. As illustrated by the operations in method 100A shown in FIG. 1A, in some embodiments, the hull may be grown (e.g., the columns and/or rows may be extended) before the hulls are combined in operation 150. In other embodiments, however, the hulls from operations 110 and 130 may be combined in operation 150 before the growing operations 122, 124, 142, 144 are performed.

Figure 2:
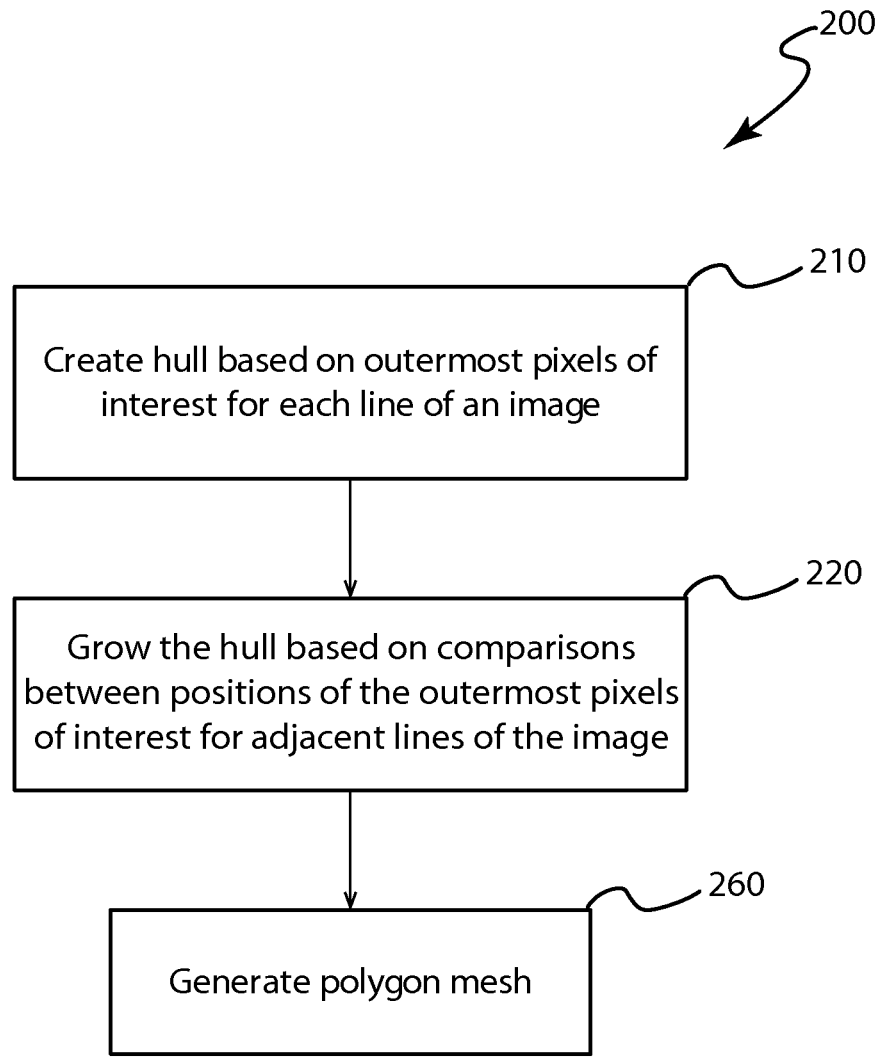
FIG. 2 is a flowchart for one embodiment of a method for creating a hull that may have concavities.

Turning now to FIG. 2, another embodiment of a method 200 is illustrated that may be used to create a hull that may have concavities and to generate a polygon mesh corresponding to that hull for use in rendering an image on a display. The method 200 may be performed by a computer graphics system, such as that shown in FIG. 7 and described below, and may be in some respects similar to methods 100, 100A shown in FIGS. 1 and 1A and described above.

Method 200 may begin with operation 210, in which a hull is created based on outermost pixels of interest for each of a plurality of lines of an image. In some embodiments, pixels from a localized region of the image may be the pixels of interest. In other words, rather than scanning for the leftmost, rightmost, uppermost, and bottommost pixels of interest for an entire image, localized regions may be scanned, thereby effectively creating a plurality of smaller hulls, or a hull with more complex concavities, for the image.

In some embodiments of operation 210, the outermost pixels of interest may be determined by including only visible pixels of the image in the hull. Also, in some embodiments the hull may be created by looking at the outermost pixels of interest in a horizontal direction (e.g., in a plurality of horizontal lines), by looking at outermost pixels of interest in a vertical direction (e.g., in a plurality of vertical lines), or by looking at outermost pixels of interest in both horizontal and vertical directions.

In operation 220, the hull is grown based on comparisons between positions of the outermost pixels of interest for two or more adjacent lines of the image, and in operation 260, a polygon mesh may be created to fill the hull, which polygon mesh may subsequently be used, for example, to render a sprite on a display. The polygon mesh in operation 260 may in some embodiments be created by following the methods 800, 900 illustrated in FIGS. 8 and 9 and described below.

A simplified computer graphics system 700 that may be configured to carry out the methods 100, 100A, 200 and operations described above is illustrated in FIG. 7.

Generally, the computer graphics system 700 includes at least one central processor 702 and one or more graphics processors 704. In some embodiments, the at least one central processor 702 and the one or more graphics processors 704 include at least one multicore processor, such as a dual core or quad core processor, for example. In some embodiments, a plurality of processors may be configured to operate in parallel. Additionally, in some embodiments, the central processor 702 and the graphic processor 704 may be part of the same group of processing cores.

The computer graphics system 700 includes a graphics memory 706 coupled directly to the graphics processor 704. The graphics memory 706 functions as execution memory and may have a relatively large memory capacity. Execution memory may include various forms of random access memory (RAM), such as dynamic RAM, static RAM, and the like. In addition to the dedicated graphics memory 706, memory/storage 708 is coupled to the central processor 702. In some embodiments, external storage may be provided and communicatively coupled to the computer graphics system. Large amounts of information and data accessible by the processor 702 may be stored on the storage device. The storage device may be a hard disk drive, a solid-state drive, or the like.

Additionally, one or more types of media players/recorders 710 are coupled to the computer graphics system 700, such as DVD drives, compact disc drives, and so forth. In some embodiments, the one or more media players may be integrated within the system 700. Image data used to generate the meshes described above may be stored on one or more types of media using the media player/recorders 710 for playback in other devices and in other environments.

User input may be provided to the system 700 via user input devices 712. The user input devices 712 may include a keyboard, a mouse, a track ball, a stylus, a camera, and so forth. The user input devices 712 allow a user to control the system 700 and provide input to the system to manipulate data to achieve a desired result.

Further, the computer graphics system 700 includes a display 714 coupled to the graphics processor 704, such as a plasma, LCD, CRT, etc., display to graphically display images and allow for interaction with a user. As such, the computer graphics system is suited to create a hull that may have concavities and to generate polygon meshes corresponding to such a hull, as well as to render one or more images (e.g., one or more sprites) on the display 714 using the generated polygon meshes. In one embodiment, the computer graphics system 700 may implement tile based deferred rendering (TBDR), in which case the image may be rendered to a plurality of tiles on the display 714.

Figure 8:
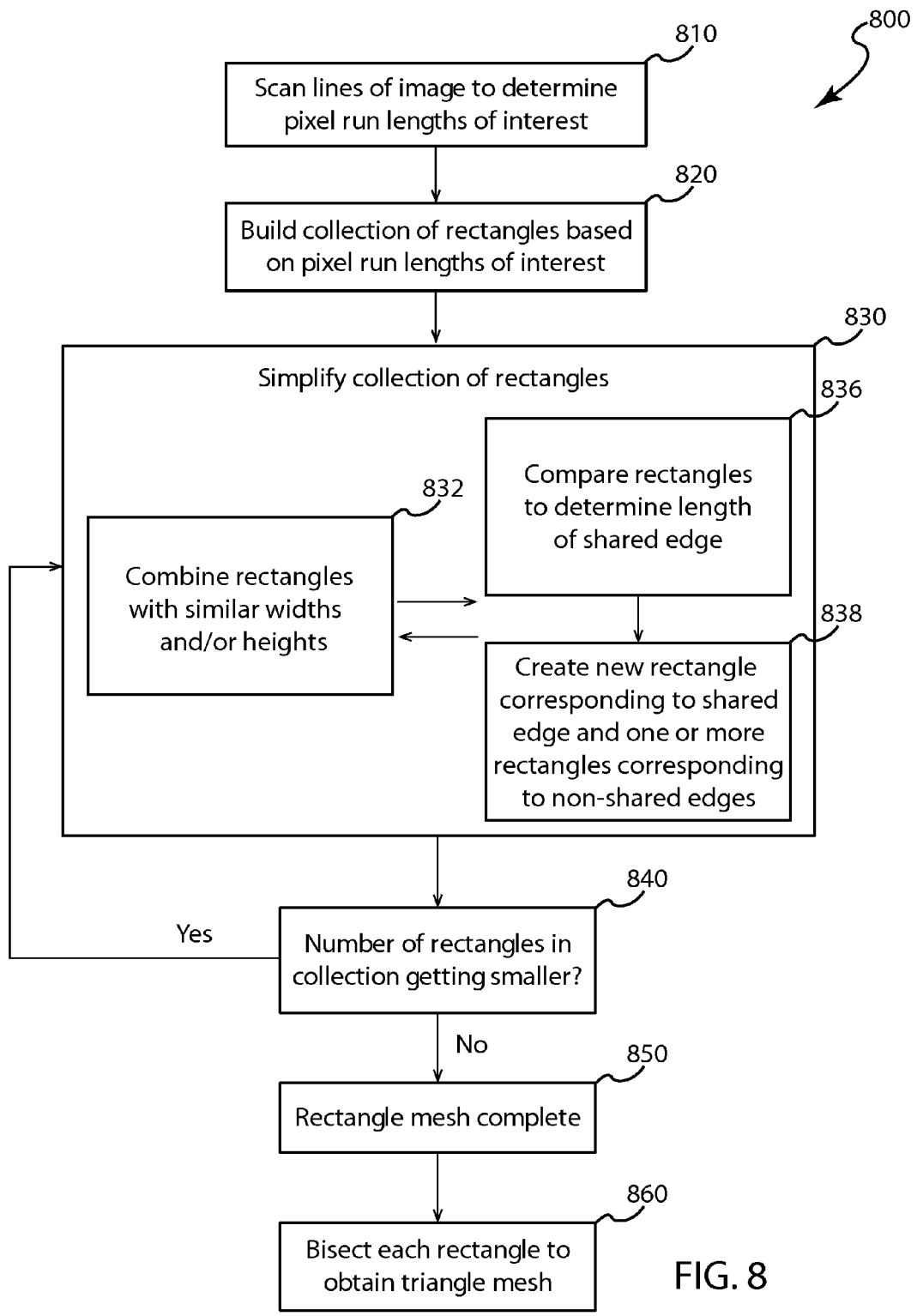
FIG. 8 is a flowchart for one embodiment of a method for generating a polygon mesh.

FIG. 8 illustrates a method 800 that may be used to generate a polygon mesh for use in rendering an image on a display. The method 800 may be performed by a computer graphics system, such as that shown in FIG. 7.

Method 800 may begin with operation 810, in which each of a plurality of lines of an image is scanned to determine one or more pixel run lengths of interest. The image may be a raster image, a texture map, or generally any type of image. Each line of the image may include no pixel run lengths of interest, one pixel run length of interest, or a plurality of pixel run lengths of interest.

The pixel run lengths of interest may be determined in some embodiments by inspecting alpha values for pixels in each of the plurality of lines. If, for example, the pixels of interest are translucent pixels, the pixel run lengths of interest will include pixels with alpha values corresponding to translucency. If, on the other hand, the pixels of interest are opaque pixels, the pixel run lengths of interest will include pixels with alpha values corresponding to opacity. If the pixels of interest are all visible pixels, the pixel run lengths of interest will include pixels with alpha values corresponding to either translucency or opacity.

In other embodiments, however, the pixel run lengths of interest may be determined in another manner—such as by inspecting color values. If, for example, a mesh encompassing all of the white or black pixels is desired, the pixel run lengths of interest may be determined by inspecting the color values for pixels in each of the plurality of lines. In one embodiment, the pixel run lengths of interest may be determined using chroma keying—for example, a specific color or range of colors may be designated as not being of interest in order to isolate a portion of an image from a background corresponding to the designated color or color range.

Referring still to operation 810, each line of the image (e.g., each horizontal line, or alternatively each vertical line) may be scanned until a pixel of interest is encountered. For a horizontal scan line, the x-position of the first pixel of interest may be noted, and the scan continues until either the scan line ends or until a pixel is encountered that is not of interest. The position of the last pixel of interest in that run length (or alternatively, the length of the run from the first pixel of interest to the last pixel of interest) is also noted. If there are still additional pixels on the current line, scanning continues to find additional possible run lengths, until the end of the line is encountered—at which point the same process is repeated for the next line, until the entire image has been scanned.

Figure 11A:
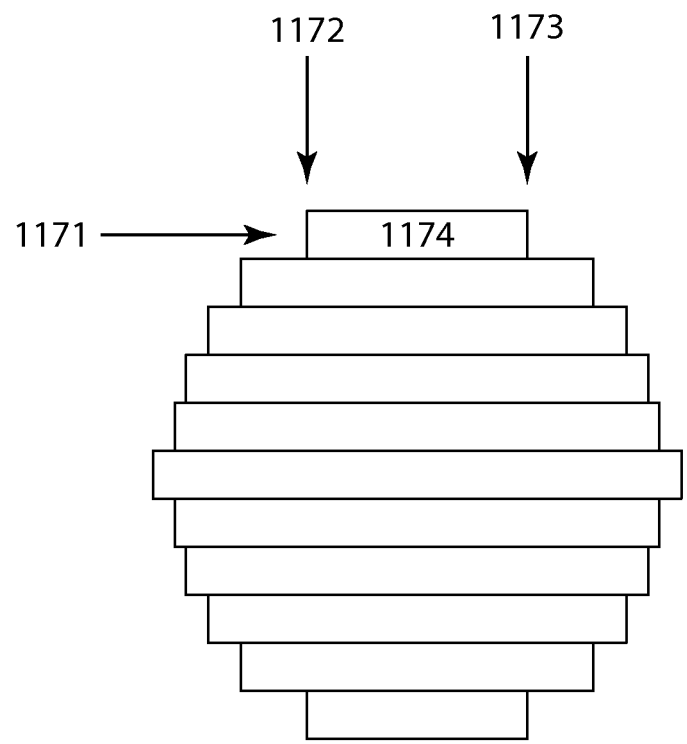
FIGS. 11A and 11B illustrate scan line run lengths that may be used during the process of generating a polygon mesh.

To illustrate operation 810, FIG. 11A shows a first horizontal line 1171 of an image. The horizontal line 1171 may be scanned until the first pixel of interest is encountered at x-position 1172. The scanning then continues until the last pixel of interest for the run length is encountered at x-location 1173. The relative positions of the two x-positions 1172, 1173 are noted, indicating a pixel run length of interest 1174, and scanning continues. Because no further pixels of interest are encountered on horizontal line 1171, scanning proceeds to the next horizontal line, and so on until all of the horizontal lines have been scanned, and the relative positions of the pixel run lengths of interest have been noted for each horizontal line.

Figure 11B:
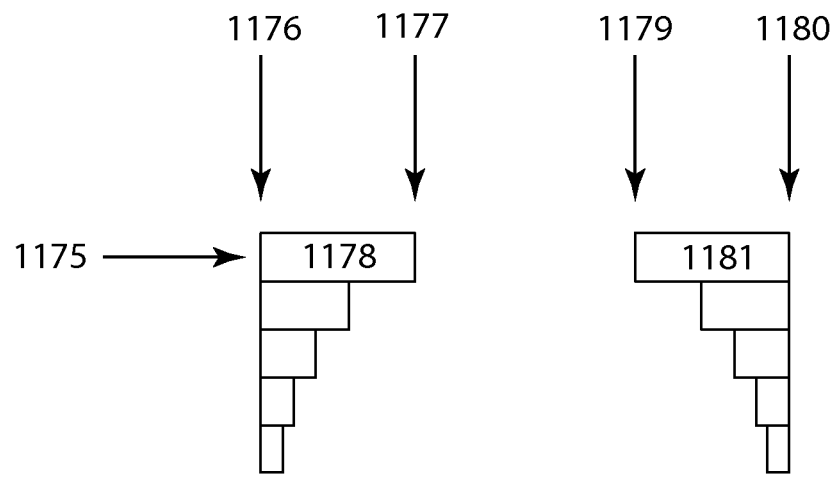

Similarly, FIG. 11B shows a first horizontal line 1175, which includes a plurality of pixel run lengths of interest. In operation 1110, horizontal line 1175 may be scanned to determine the beginning x-position 1176 and ending x-position 1177 of a first pixel run length of interest 1188, as well as the beginning x-position 1179 and ending x-position 1180 of a second pixel run length of interest 1181.

In operation 820, a collection (e.g., a list) of rectangles is built based on the one or more pixel run lengths from the plurality of lines that were determined in operation 810. Depending on which pixels were deemed of interest in operation 810, the collection of rectangles may be built by including translucent and/or opaque pixel run lengths. A collection of rectangles with both translucent and opaque pixel run lengths may encompass all of the visible pixels in the image, but no transparent pixels in the image.

The collection of rectangles may be built in operation 820 by converting each of the scan line run lengths of interest into rectangles that are one pixel in height. Referring to FIGS. 11A and 11B, for example, each pixel run length of interest 1174, 1178, 1181 may be converted into a one pixel high rectangle 1174, 1178, 1181, with the left and right sides of the rectangles 1174, 1178, 1181 defined by the respective beginning and ending x-positions of the pixel run lengths of interest and the top and bottom sides of the rectangles 1174, 1178, 1181 defined by the y position of the horizontal lines 1171, 1175, respectively, within the image.

Referring again to the method 800 illustrated in FIG. 8, in operation 830, the collection of rectangles may be simplified—for example, the collection may be simplified in that the overall number of rectangles in the collection is reduced while the overall sizes of the rectangles increases. More specifically, in operation 832, one or more rectangles may be combined with one or more other rectangles in the collection that have similar widths and/or similar heights.

In operation 836, one or more of the rectangles in the collection of rectangles may be compared with one or more of the other rectangles in the collection of rectangles (such as two adjacent rectangles) to determine whether a first length of a shared edge between the (two adjacent) rectangles is greater than a second length of one or both of the (two adjacent) rectangles that is not shared between the (two adjacent) rectangles. If the first length is greater than the second length, one or more new rectangles may be created that correspond to the shared edge, and one or more additional new rectangles may also be created that correspond to one or more non-shared edges of the two adjacent rectangles in operation 838. Depending on the first and second lengths (i.e., depending on the length of the shared and non-shared edges of the rectangles), operation 838 may result in a temporary increase in the number of rectangles in the collection—as shown in FIGS. 12A through 12C, which are described below. This increase may, however, be counteracted in a subsequent iteration of operation 832, in which rectangles with similar heights and/or widths are combined. Alternatively, the increase may not be counteracted in some examples.

In some embodiments of operation 836, each of the rectangles in the collection of rectangles may be compared with every one of the other rectangles in the collection of rectangles to determine whether the rectangle of interest shares an edge with any of the other rectangles. Similarly, in operation 838, each of the rectangles in the collection of rectangles may be compared with every one of the other rectangles in the collection of rectangles to determine whether the rectangle of interest has a similar width and/or height as any of the other rectangles.

As described below in more detail with reference to FIGS. 10A through 10F, in some examples the shared edge referenced in operation 836 and 838 may be a horizontal shared edge, or it may be a vertical shared edge.

Referring again to operation 838, the one or more new rectangles and the one or more additional new rectangles may be added to the collection of rectangles, and the two adjacent triangles from which the one or more new rectangles and the one or more additional new rectangles were created may be removed from the collection of rectangles.

In some embodiments, operations 832, 836, and 838 may be performed iteratively, as described below with reference to FIGS. 10A through 10F.

To illustrate operations 832, 836, 838, FIG. 12A shows two pixel run lengths of interest 1282, 1283 that have been converted into rectangles 1282, 1283. In operation 836, the two rectangles 1282, 1283 may be compared to determine the length of the shared edge 1284 between the two rectangles 1282, 1283—which in FIG. 8A is greater than the combined length of non-shared edges 1285, 1286. Thus, in operation 838, rectangle 1282 may be divided into rectangles 1287 (corresponding to shared edge 1284), 1288 (corresponding to non-shared edge 1286), and rectangle 1283 may be divided into rectangles 1289 (corresponding to non-shared edge 1285), 1290 (corresponding to shared edge 1284). Next, in operation 832, rectangles 1287, 1290 may be combined into new rectangle 1291 because they have a similar width, which corresponds with shared edge 1284 of rectangles 1282, 1283. FIGS. 12B and 12C also illustrate the operation of operations 832, 836, 838 for rectangles of different relative sizes.

Referring again to the method 800 illustrated in FIG. 8, in operation 840, the number of rectangles in the collection may be compared with the number of rectangles in the collection from the previous iteration of operation 830, and if the number of rectangles in the collection has gotten smaller, flow may return to operation 830 again. If the number of rectangles in the collection has ceased getting smaller (e.g., it increased as compared to the previous iteration), then flow continues to operation 850, in which the rectangle mesh is complete. In some examples, the completed rectangle mesh may correspond to the collection of rectangles as it existed immediately preceding the operation 830 in which the number of rectangles increased.

In operation 860 of method 800, the rectangles in the rectangle mesh from operation 850 may optionally be bisected in order to obtain a triangle mesh. The resulting rectangle or triangle mesh may in some embodiments be a pixel-accurate mesh that encompasses all of the pixels of interest and none of the pixels that are not of interest. For example, if both translucent and opaque pixels were included in the pixel run lengths of interest in operation 810, the resulting rectangular or triangular mesh may exactly circumscribe all of the visible pixels in the image and none of the transparent pixels in the image—such as the mesh 1392 that is overlaid on the image 1393 in FIG. 13.

In the event that the image is a texture map corresponding to a sprite, either the rectangle mesh from operation 850 or the triangle mesh from operation 860 may be used to render the sprite on a display. Again assuming that translucent and opaque pixels were included, using the mesh to render the sprite may use a minimum amount of fill rate by rendering only the visible pixels, and rendering none of the transparent pixels. Alternatively, if two different meshes were created— one for the translucent pixels and another for the opaque pixels, the opaque pixels may be rendered using a write only command, while the translucent pixels may be rendered using a read-modify-write command, thereby again using the minimum fill rate possible to render the sprite.

Alternatively, the polygon (e.g., rectangle or triangle) mesh may be used in one or more other manners. For example, the polygon mesh may be used as the basis for generating more complex geometry from the image—such as extruding the mesh to create a solid with an outline that exactly matches the visible parts of the image. As another example, a 3D topographic map may be created using color information (as opposed to the alpha values) of each pixel, where different colored pixels represent different topographic altitudes.

Figure 9:
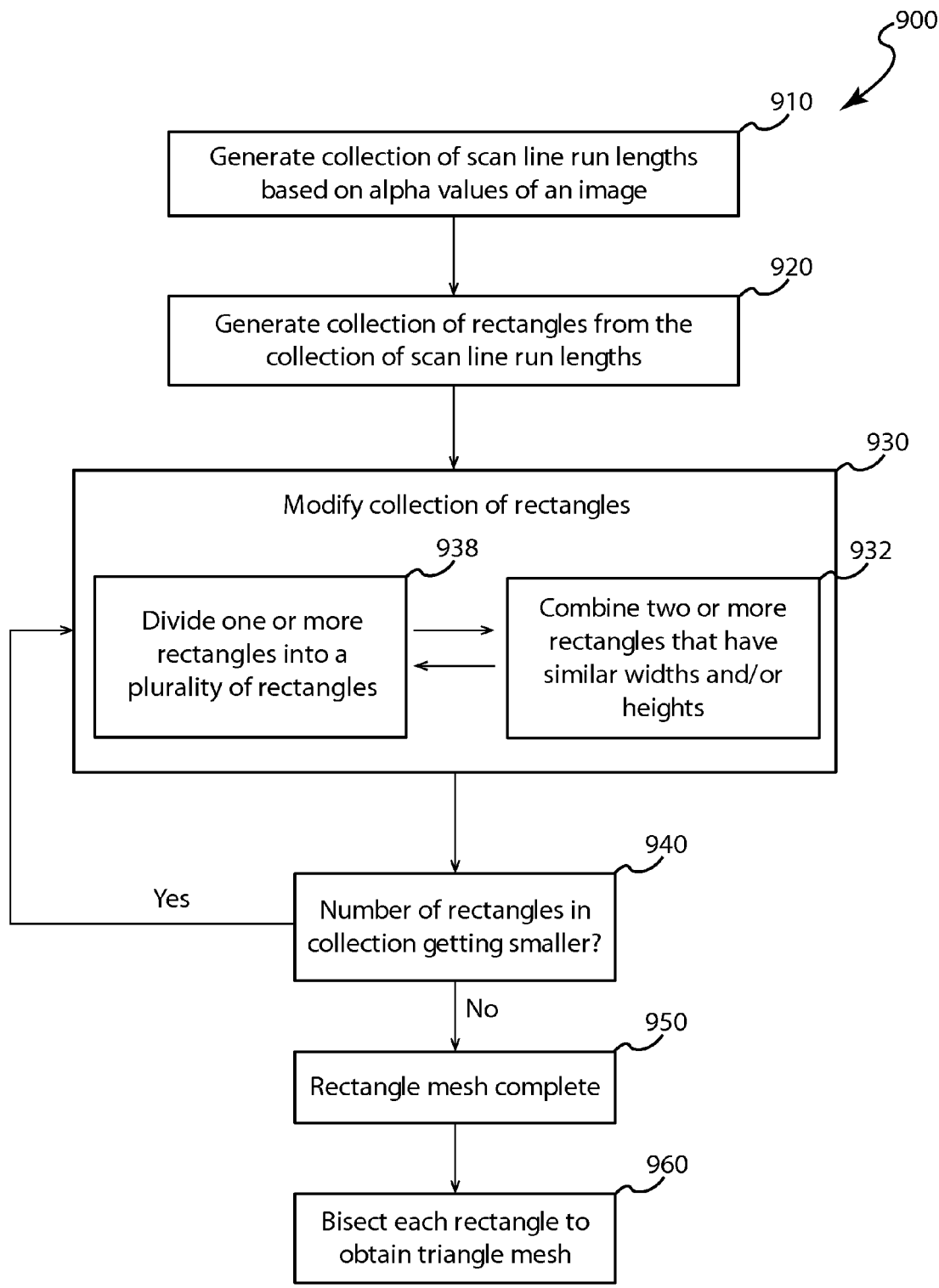
FIG. 9 is a flowchart for one embodiment of a method for generating a polygon mesh.
Figure 10A:
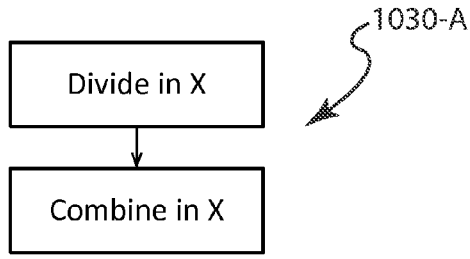
FIGS. 10A through 10F are flowcharts for generating a polygon mesh.
Figure 10B:
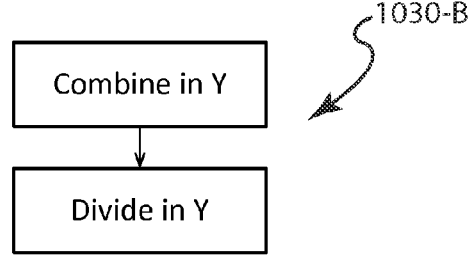
Figure 10C:
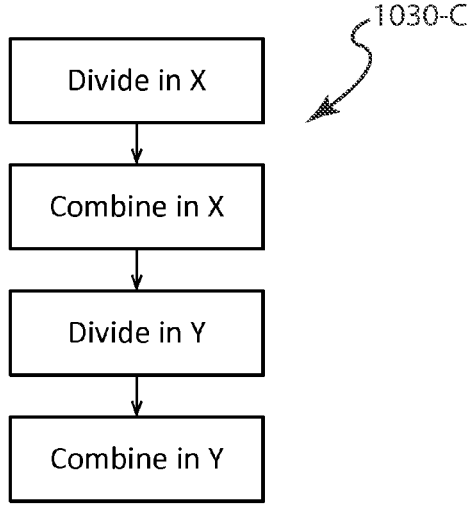
Figure 10D:
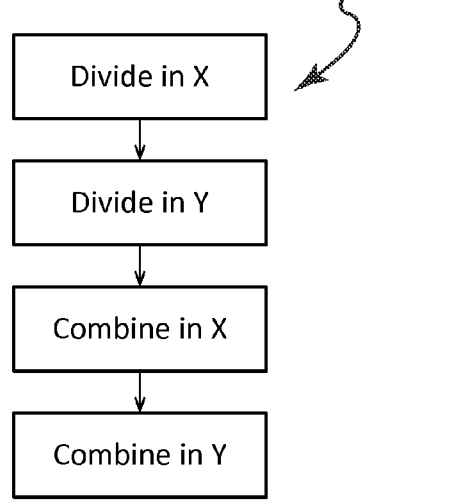
Figure 10E:
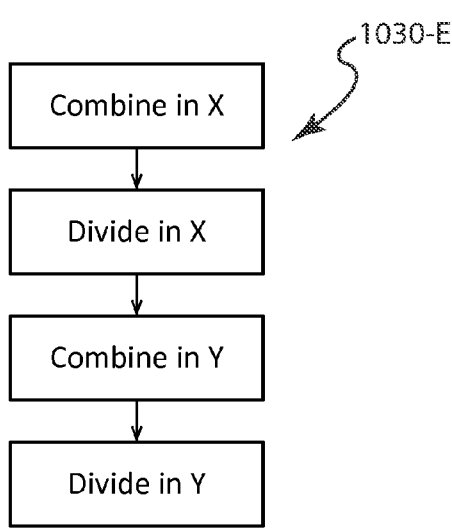
Figure 10F:
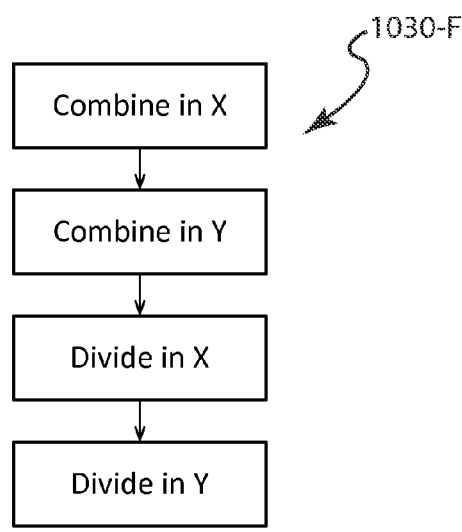

Turning now to FIG. 9, another embodiment of a method 900 is illustrated that may be used to generate a polygon mesh for use in rendering an image (e.g., raster image, texture map, etc.) on a display. Method 900 may be performed by a computer graphics system, such as that shown in FIG. 7, and may be in some respects similar to method 800 shown in FIG. 8 and described above.

Method 900 may begin with operation 910, in which a collection of scan line run lengths is generated based on alpha values of an image. The collection of scan line run lengths may be generated by scanning each row of pixels in the image from left to right, or from right to left. Alternatively, the scan line run lengths may be vertical—in which case they would be generated by scanning each column of pixels in the image from top to bottom or bottom to top. In operation 920, a collection of rectangles may be created by associating each respective scan line run length with a respective rectangle.

FIGS. 11A and 11B illustrate the use of operations 910, 920 on an image. Specifically, in operation 910, scan line run lengths 1174, 1178, 1181 may be generated based on first and last included pixel positions 1172, 1173, 1176, 1177, 1179, 1180 of respective scan lines of respective images— with the included pixels being determined based on the alpha values of each pixel. In operation 920, each of the scan line run lengths 1174, 1178, 1181 may be converted to a respective rectangle 1174, 1178, 1181.

Returning to method 900 as illustrated in FIG. 9, the collection of rectangles may be modified in operation 930. Specifically, in operation 938, one or more rectangles in the collection of rectangles may be divided into a plurality of rectangles. In operation 932, two or more adjacent rectangles in the collection may be combined if they have similar widths and/or heights.

In some embodiments, one (or more) rectangles may be divided into the plurality of rectangles in operation 938 so that one of the plurality of (new) rectangles can be combined with an adjacent rectangle in operation 932. In other embodiments, two rectangles in the collection of rectangles may each be divided into a respective plurality of rectangles in operation 938, and one of the plurality of rectangles from a first of the two rectangles may be combined with one of the plurality of rectangles from a second of the two rectangles in operation 932.

In some embodiments, operations 932 and 938 may be done iteratively—for example until the collection of rectangles ceases to decrease in number (see operation 940 below).

FIGS. 12A through 12C illustrate the use of operations 932, 938 on an image. In FIG. 12A specifically, rectangles 1282 and 1283 are each divided into rectangles 1287, 1288 and 1289, 1290, respectively, in operation 938. In operation 938, rectangles 1287 and 1290 are combined into rectangle 1291 because they have a similar width.

Returning to FIG. 9, the number of rectangles in the collection may be compared in operation 940 with the number of rectangles in the collection from the previous iteration of operation 930, and, if the number of rectangles in the collection has gotten smaller, flow may return to operation 930 again. If the number of rectangles in the collection has ceased getting smaller (e.g., it increased as compared to the previous iteration), then flow continues to operation 950, in which the rectangle mesh is complete. In some examples, the completed rectangle mesh may correspond to the collection of rectangles as it existed immediately preceding the operation 930 in which the number of rectangles increased.

Figure 13:
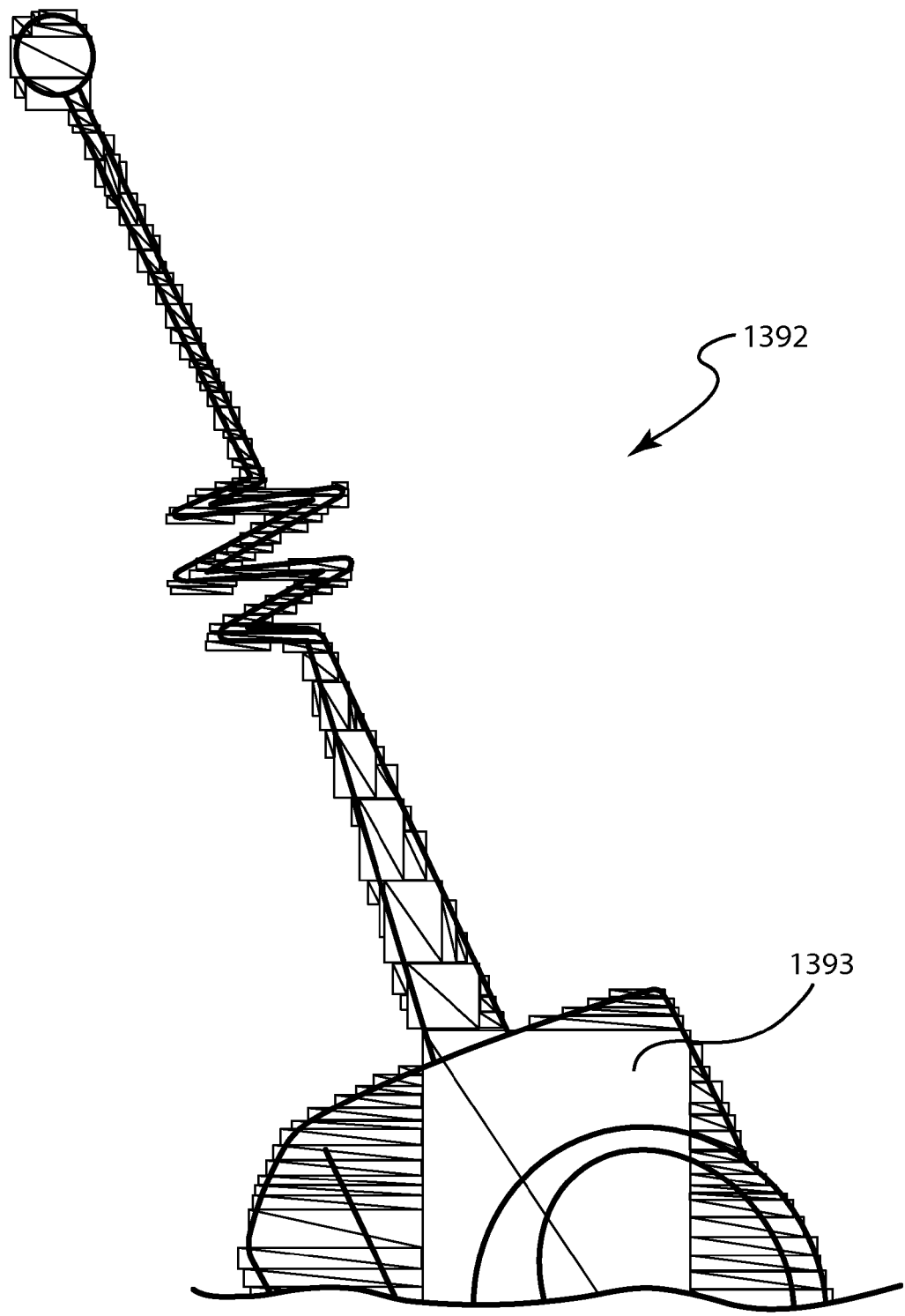
FIG. 13 illustrates one example of a polygon mesh overlaid on an image.

In operation 960, the rectangles in the rectangle mesh from operation 950 may optionally be bisected in order to obtain a triangle mesh. The polygon (e.g., rectangle, triangle) mesh resulting from method 900 may be used in many different manners, including those described above. FIG. 13 illustrates one example of a mesh 1392 overlaid on image 1393 that may be obtained by following the operations in method 900.

With reference now to FIGS. 10A through 10F, the operation 830 in method 800 and the operation 930 in method 900 may take many different forms. As previously mentioned, the respective sub-operations 832, 836, 838 and 932, 938 may be done iteratively, and may be done with respect to horizontal and/or vertical lines of an image. For example, operations 830, 930 may be performed in a horizontal dimension only, in a vertical dimension only, in horizontal and then vertical dimensions, in vertical then horizontal dimensions, and so forth.

Further, the relative order of sub-operations 832, 836, 838, 932, 938 within operations 830, 930 may be varied in different embodiments. In one example, as illustrated by the flowchart 1030-A, operation 830 may begin with the division of rectangles in sub-operations 836/838 performed in the X (horizontal) dimension, followed by the combination of rectangles in sub-operation 832 performed in the X dimension. Similarly, still referring to flowchart 1030-A, operation 930 may begin with the division of rectangles in sub-operation 938 performed in the X dimension, followed by the combination of rectangles in sub-operation 932 performed in the X direction.

Flowcharts 1030-B, 1030-C, 1030-D, 1030-E, and 1030-F also illustrate a few additional combinations of relative orders for sub-operations 832, 836, 838, 932, 938 within operations 830, 930. Of course, many other combinations are possible, including iterative combination of the sub-operations 832, 836, 838, 932, 938, as described above.

The systems and associated methods in accordance with the present disclosure have been described with reference to particular examples thereof in order to illustrate the principles of operation. The above description is thus by way of illustration and not by way of limitation. Various modifications and alterations to the described examples will be apparent to those skilled in the art in view of the teachings herein. Those skilled in the art may, for example, be able to devise numerous systems, arrangements and methods which, although not explicitly shown or described herein, embody the principles described and are thus within the spirit and scope of this disclosure. Accordingly, it is intended that all such alterations, variations, and modifications of the disclosed examples are within the scope of this disclosure. For example, while FIGS. 1, 1A and 2 illustrate embodiments of methods 100, 100A, 200 for creating a hull that may have concavities, the variations and comments described with reference to one method 100 be applied to the operations in the other methods as appropriate, and vice versa.

In methodologies directly or indirectly set forth herein, various steps and operations are described in one possible order of operation, but those skilled in the art will recognize that the steps and operations may be rearranged, replaced, or eliminated without necessarily departing from the spirit and scope of the disclosed examples. Steps or acts described in sequential order may be implemented before, after, sequentially or non-sequentially as may fit the particular description.

All relative and directional references (including vertical, horizontal, up, down, left, right, top, bottom, and so forth) are given by way of example to aid the reader's understanding of the particular examples described herein—although it will be understood that implementations of the present disclosure may include variations on the specific relative and directional references used based on the frame of reference of specific implementations.

What is claimed is:

1. A method, comprising:
   creating, by a processor, a collection of columns based on an upper pixel of interest and a lower pixel of interest for each of a plurality of vertical lines of an image, the collection of columns representing a first hull;
   growing, by the processor, the first hull by increasing a height of one or more columns in the collection of columns based on a comparison between positions of the upper and/or lower pixels of interest for two or more adjacent vertical lines of the image, wherein the height of the one or more columns in the collection of columns is increased based on the positions of the upper and/or lower pixels of interest for two or more adjacent vertical lines of the image being within a first error tolerance of each other;
   creating, by the processor, a collection of rows based on a leftmost pixel of interest and a rightmost pixel of interest for each of a plurality of horizontal lines of the image, the collection of rows representing a second hull;
   growing, by the processor, the second hull by increasing a width of one or more rows in the collection of rows based on a comparison between positions of the leftmost and/or rightmost pixels of interest for two or more adjacent horizontal lines of the image, wherein the width of the one or more rows in the collection of rows is increased based on the positions of the leftmost and/or rightmost pixels of interest for two or more adjacent horizontal lines of the image being within a second error tolerance of each other;
   creating, by the processor, a third hull by combining the first and second hulls; and
   generating, by the processor, a polygon mesh corresponding to the third hull, wherein the polygon mesh defines a number of pixels of the image to be rendered for display; and
   rendering, by the processor, a sprite for display, wherein the sprite includes pixels located within the polygon mesh.

2. The method of claim 1, further comprising determining, by the processor, the first and second error tolerances based on a target number of polygons to be included in a polygon mesh corresponding to the third hull.

3. The method of claim 2, wherein the target number of polygons is determined based on known hardware characteristics, and the polygons are triangles.

4. The method of claim 1, wherein the image is a texture map.

5. The method of claim 1, further comprising:
   creating, by the processor, a collection of scan line run lengths corresponding to the third hull;
   creating, by the processor, a collection of rectangles by associating each respective scan line run length with a respective rectangle; and
   modifying, by the processor, the collection of rectangles by
      dividing, by the processor, one or more rectangles in the collection of rectangles into a plurality of rectangles; and
      combining, by the processor, two or more adjacent rectangles in the collection of rectangles that have similar widths and/or heights.

6. The method of claim 5, wherein one or more of the plurality of horizontal lines of the image include two or more scan line run lengths.

7. The method of claim 1, wherein the third hull is created by generating, by the processor, a collection of scan line run lengths corresponding to pixels present in both the first and second hulls.

8. The method of claim 1, wherein the first hull is grown by comparing adjacent vertical lines moving from left to right, and then from right to left.

9. The method of claim 1, wherein
each column of the collection of columns is a one-dimensional vertical line extending in a first direction; and
each row of the collection of rows is a one-dimensional horizontal line extending in a second direction.

10. The method of claim 9, wherein
increasing the height of the one or more columns comprises extending the one or more columns in the first direction; and
increasing the width of the one or more rows comprises extending the one or more rows in the second direction.

11. The method of claim 10, wherein
the adjacent vertical lines are contiguous in the second direction; and
the adjacent horizontal lines are contiguous in the first direction.

12. A method, comprising:
creating, by a processor, a hull based on outermost pixels of interest for each of a plurality of lines of an image, wherein the lines extend in a first direction;
growing, by the processor, the hull in the first direction based on comparisons between positions of the outermost pixels of interest for two or more lines of the image that are adjacent in a second direction, wherein the hull is grown in the first direction based on the positions of the outermost pixels of interest for two or more lines that are adjacent in the second direction being within a first error tolerance of each other;
generating, by the processor, a polygon mesh to fill the hull; and
rendering, by the processor, a sprite for display, wherein the sprite includes pixels located within the polygon mesh.

13. The method of claim 12, wherein the outermost pixels of interest are determined by including only visible pixels of the image in the hull.

14. The method of claim 12, wherein each of the plurality of lines of the image are horizontal lines and each of the two or more adjacent lines of the image are also horizontal lines.

15. A method, comprising
creating, by a processor, a collection of columns based on an upper pixel of interest and a lower pixel of interest for each of a plurality of vertical lines of an image;
creating, by the processor, a collection of rows based on a leftmost pixel of interest and a rightmost pixel of interest for each of a plurality of horizontal lines of the image;
extending, one or more columns in a vertical direction based on a horizontally adjacent column, wherein the one or more columns are extended based on the positions of the upper and/or lower pixels of interest for the one or more columns and the horizontally adjacent column being within a first error tolerance of each other;
defining, by the processor a hull that includes pixels represented in both the collection of columns and the collection of rows; and
rendering, by the processor, a plurality of pixels, wherein the plurality of pixels comprises only the pixels included in the hull.

16. The method of claim 15, wherein the one or more columns and/or one or more rows are extended to a height of an adjacent column or a width of an adjacent row.

17. The method of claim 15, wherein the hull is a first hull, the collection of columns represents a second hull that is concave on a top and/or on a bottom side, the collection of rows represents a third hull that is concave on a right and/or on a left side, and the first hull is defined to include concavities from both the second and third hulls.

18. A system, comprising:
a processor configured to create a hull based on outermost pixels of interest for each of a plurality of lines of an image, grow the hull in a first dimension based on comparisons between positions of the outermost pixels of interest for two or more adjacent lines of the image in a second dimension, wherein the hull is grown in the first dimension based on the positions of the outermost pixels of interest for the two or more adjacent lines of the image in the second dimension being within a first error tolerance of each other, and generate a polygon mesh to fill the hull; and a display coupled to the processor and configured to render a plurality of pixels within the polygon mesh generated by the processor.

19. The system of claim 18, wherein the processor is configured to render the image on the display using tile based deferred rendering.

* * * * *